US006809780B2

(12) United States Patent
Sawai et al.

(10) Patent No.: US 6,809,780 B2
(45) Date of Patent: Oct. 26, 2004

(54) PROJECTOR WITH FAN CONTROLLER

(75) Inventors: Yasumasa Sawai, Yamatotakada (JP); Iwao Adachi, Moriguchi (JP); Satoshi Onishi, Sakai (JP); Kazuhiko Inoue, Suita (JP); Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 489 days.

(21) Appl. No.: 09/902,346

(22) Filed: Jul. 10, 2001

(65) Prior Publication Data
US 2002/0005916 A1 Jan. 17, 2002

(30) Foreign Application Priority Data

Jul. 11, 2000 (JP) .................................. 2000-209998

(51) Int. Cl.[7] .............................................. H04N 5/74
(52) U.S. Cl. ...................................... 348/748; 353/57
(58) Field of Search ............................ 348/748, 744; 353/52, 57, 58, 60

(56) References Cited

U.S. PATENT DOCUMENTS

| 4,337,497 A | * | 6/1982 | Dalle Carbonare | ......... 361/239 |
| RE36,060 E | * | 1/1999 | Miyashita | .................. 348/748 |
| 6,360,185 B1 | * | 3/2002 | Futawatari | .................. 702/182 |
| 6,419,364 B2 | * | 7/2002 | Takizawa et al. | ............. 353/52 |

FOREIGN PATENT DOCUMENTS

| JP | 07-152009 A | 6/1995 | | |
| JP | 08-068979 A | 3/1996 | | |
| JP | 09127956 A | * | 5/1997 | ......... G10K/11/178 |
| JP | 09-197364 A | 7/1997 | | |
| JP | 11-119342 A | 4/1999 | | |
| JP | 11-354963 A | 12/1999 | | |

* cited by examiner

Primary Examiner—Victor R. Kostak
(74) Attorney, Agent, or Firm—Sidley Austin Brown & Wood LLP

(57) ABSTRACT

A projector, which projects color images using the three liquid crystal panels (41–43) while cooling them by the fans (611–613) for G, R, and B panels, comprises the level calculation unit (711) for finding the intensity levels of the R, G, and B components of image signals, the level calculation unit (721) for finding the voice levels of voice signals, the fan control unit (73) for controlling the numbers of revolutions of the fans (611–613), and the memory (761) for storing the cumulative amount of lighting time of the lamp (21). As the intensity levels get higher, the numbers of revolutions of the fans are increased, and as the cumulative amount of lighting time becomes larger, the numbers of revolutions of the fans are decreased. As a result, unnecessary noises caused by the fans (611–613) can be reduced while the liquid crystal panels (41–43) are properly cooled. Thus, the present invention has an object of reducing the noise of the fan which cools the display devices such as liquid crystal panels in a projector. Thus, the object of the present invention is to realize a reduction in noise caused by the fan for cooling a display device such as liquid crystal panels in a projector.

17 Claims, 5 Drawing Sheets

PROJECTOR WITH FAN CONTROLLER

This application is based on application No. 2000-209998 filed in Japan.

BACKGROUND OF THE INVENTION

1. Field of the Invention

The present invention relates to a projector for projecting images.

2. Description of the Background Art

A projector utilizing liquid crystal panels controls these panels based on image signals, and guides light from a lamp to the panels and then to the screen, thereby projecting images on the screen. The lamp used in such a projector has high intensity because images formed on the liquid crystal panels are projected as magnified images by using an optical system. Being irradiated in a high illumination, the liquid crystal panels get hot. The liquid crystal panels realize image display by partly shielding the light from the lamp using a polarizer, so that the vicinity of the polarizer gets hot in particular.

It has been conventionally conducted to cool the liquid crystal panels by supplying the panels with a current of air from a cooling fan.

However, the fan makes untoward noises. Since the recent projectors use a fan having a high blowing capability in keeping with the high intensity of the lamp, the fan makes more noises.

In the case of a rear-projection type television system with a projector, the cooling fan is stored in a large casing and used in an ordinary household, so that the noise reduction of the fan is an important issue.

SUMMARY OF THE INVENTION

According to the present invention, a projector comprising: a light source; an optical system for guiding light from the light source to an projective region; a display device for modulating the light from the light source, based on image signals, the display device being arranged in a light path of the optical system; at least one fan for cooling the display device; and a fan controller for receiving signals based on the image signals and varying a number of revolutions of the at least one fan in accordance with changes in the image signals.

Thus, in the projector, the number of revolutions of at least one fan is varied in accordance with changes in the image signals, which makes it possible to reduce unnecessary noise caused by the fan.

In an aspect of the present invention, the fan controller receives signals based on voice signals, and changes the number of revolutions of the at least one fan in accordance with changes in the voice signals.

Thus, in the projector, the number of revolutions of at least one fan is varied in accordance with changes in the voice signals, which makes it possible to reduce untoward noises caused by the fan.

In another aspect of the present invention, while changing the number of revolutions of the at least one fan, the fan controller provides fluctuations to the numbers of revolutions.

Thus, the number of revolutions of at least one fan is given fluctuations, which makes it possible to reduce untoward noises caused by the fan.

In another aspect of the present invention, the projector further comprises a memory for storing data concerning cumulative amount of lighting time of the light source, wherein the fan controller reduces the number of revolutions of the at least one fan, as the cumulative amount of lighting time becomes larger.

Thus, the noises caused by the fan can be reduced in accordance with a decrease in intensity of the light source.

In another aspect of the present invention, the display device has a plurality of component devices corresponding to a plurality of colored lights; the at least one fan includes a plurality of fans arranged separately in correspondence with the plurality of component devices so as to cool the plurality of component devices separately; and the fan controller controls the number of revolutions of the plurality of fans separately, based on the image signals corresponding to the plurality of colored lights.

Thus, in the projector, a plurality of fans can be individually controlled.

In further another aspect of the present invention, the display device is a single device for displaying images based on color image information; the at least one fan is a single fan for cooling the single device; and the fan controller changes the number of revolutions of the single fan in accordance with changes of G and B color components contained in the image signals.

Thus, in the projector, the control of the fan can be simplified.

According to the present invention, a projector comprising: a screen; a main-body casing which forms the outside shape of the projector and in which the screen is installed; a light source; an optical system for guiding light from the light source to the screen; a display device for modulating the light from the light source, based on image signals, the display device being arranged in a light path of the optical system; at least one fan for cooling the display device; and a fan controller for receiving signals based on the image signals and varying a number of revolutions of the at least one fan in accordance with changes in the image signals.

Therefore, noises can be reduced in the case with a screen and a main-body casing additionally provided.

Thus, the object of the present invention is to realize a reduction in noise (including substantial noise reduction of eliminating grating noise) caused by the cooling fan in a projector.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. First Preferred Embodiment>

Figure 1:
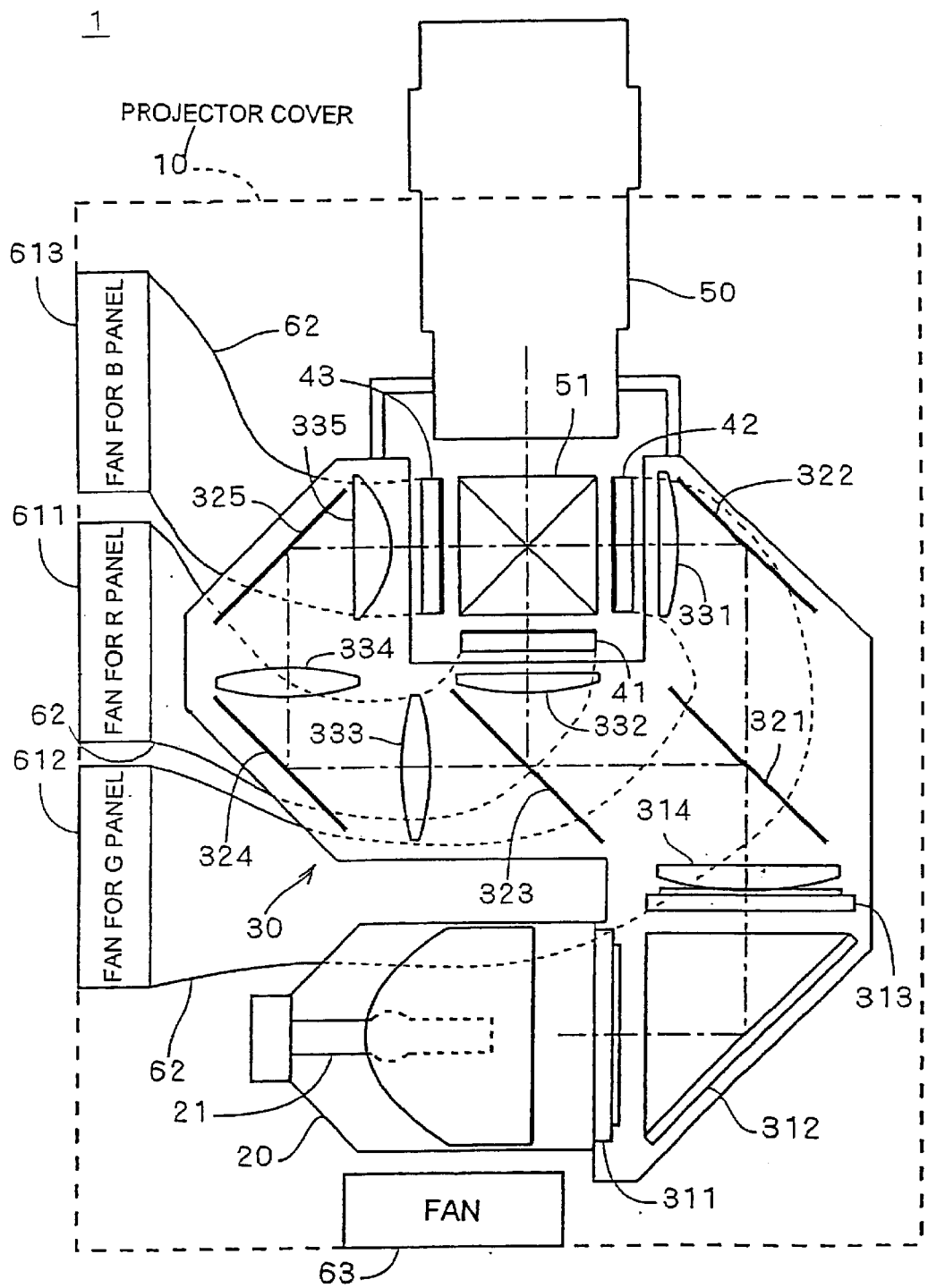
FIG. 1 shows the structure of the projector of a first preferred embodiment.

FIG. 1 shows the structure of the projector 1 of the first preferred embodiment of the present invention. FIG. 1 is illustrated in a simplified manner to make the internal components understood better.

The projector 1 comprises, inside its cover 10, a light source unit 20 for generating light for projection; an optical system 30 for dividing the light from the light source unit 20 into color light of red (R), green (G), and blue (B); three liquid crystal panels 41, 42, and 43 for individually providing the red, green, and blue light with image data (non-uniform light intensity corresponding to images) by partly shielding each of the color light; a synthesizing prism 51 for synthesizing color light that has passed the liquid crystal panels; and a lens unit 50 for projecting the synthesized light at the screen installed in a predetermined projecting position.

To be more specific, the optical system 30, the synthesizing prism 51 and the lens unit 50 compose a projective optical system which guides the light from the light source unit 20 to the screen, and the three liquid crystal panels 41–43 are arranged on a light path of the projective optical system.

On the cover 10 are provided three fans 611, 612, and 613 for cooling the liquid crystal panels 41, 42, and 43; the currents of air from these fans 611–613 are guided to the liquid crystal panels 41–43 through respective ducts 62. In FIG. 1, the currents of air caused by the fans 611–613 flow from the back side towards the front side of paper, or in the direction along the surfaces of the liquid crystal panels 41–43, and then are discharged.

In the following description, the liquid crystal panels 41–43 are distinguished from each other by being respectively referred to as the G liquid crystal panel 41, the R liquid crystal panel 42, and the B liquid crystal panel 43 corresponding to the red, the green, and the blue light, respectively. The fans 611–613 leading to the liquid crystal panels 41–43 are respectively referred to as the fan 611 for G panel, the fan 612 for R panel, and the fan 613 for B panel.

The light source unit 20 has a discharge lamp 21 as a light source, and the light from the lamp 21 is discharged towards the optical system 30. Since the lamp 21 gets hot, the cover 10 is further provided with a fan 63 for cooling the lamp 21.

The light from the light source unit 20 is converted into polarized light whose intensity distribution is approximately uniform by a lens array 311, a PBS prism (polarized-beam separating prism) 312, a lens array 313, and a cemented lens 314 of the optical system 30.

The light which has passed the cemented lens 314 is divided by a dichroic mirror 321 into red light and light of the other components; the red light is guided to the R liquid crystal panel 42 via a mirror 322 and a lens 331.

The light of the other components from the dichroic mirror 321 is further divided by another dichroic mirror 323 into green light and blue light. The green light is guided to the G liquid crystal panel 41 via a lens 332, while the blue light is guided to the B liquid crystal panel 43 via a lens 333, a mirror 324, a lens 334, a mirror 325, and a lens 335.

The three liquid crystal panels 41–43 supply the color light of red, green, and blue with data about the red, green, and blue components of images to be projected. Later, the synthesizing prism 51 synthesizes image light which reflects one color image.

The light synthesized by the synthesizing prism 51 is guided to the screen which forms a projective region by the lens unit 50 having a plurality of lenses for projection, so that a color image can be projected on the screen.

Figure 2:
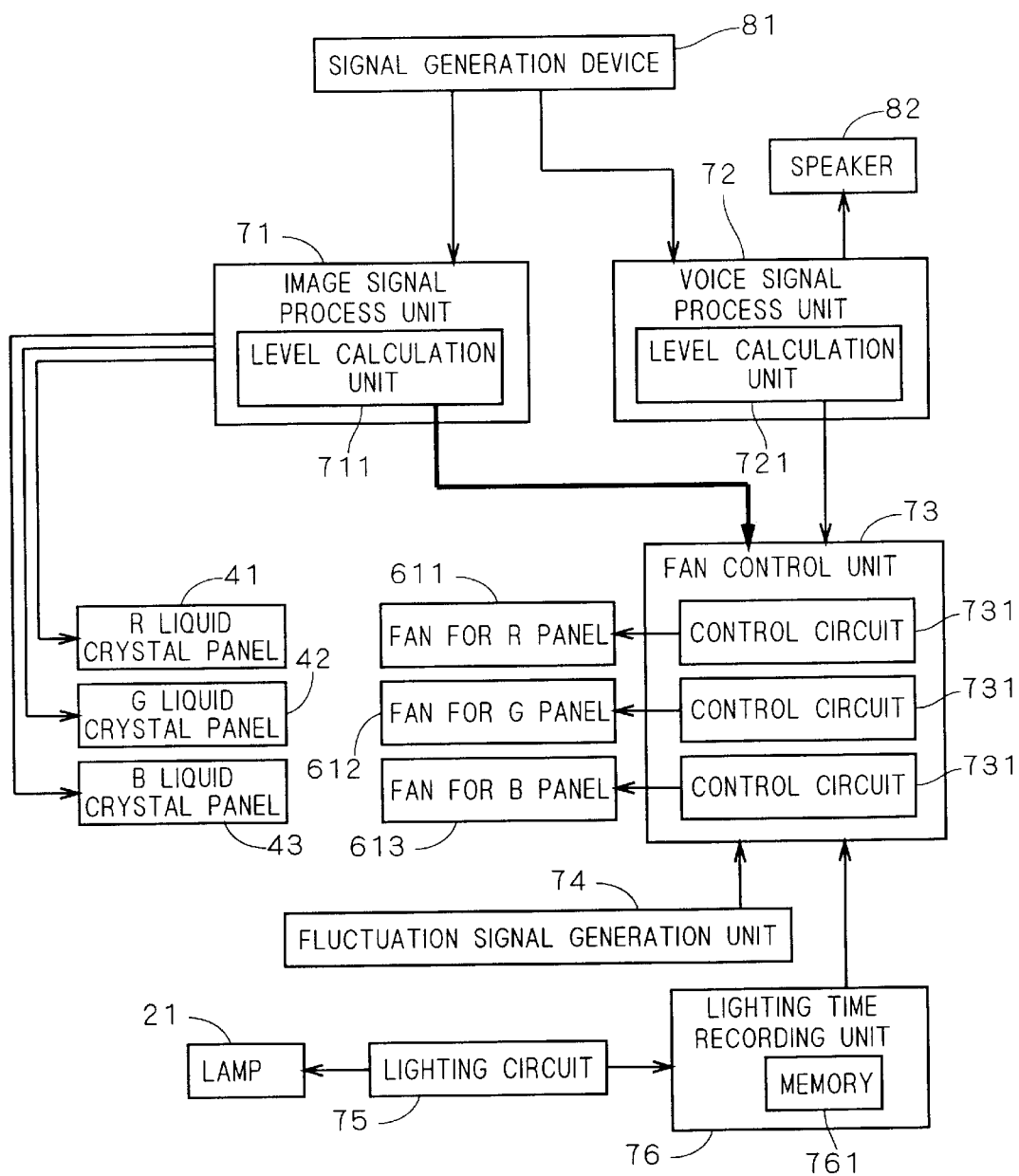
FIG. 2 shows the structure involving the control of the fan and other structures.

FIG. 2 is a block diagram showing the structure involving the control of the fans 611–613 together with the other structures. The projector 1 comprises, as the structure involving the control of the fans 611–613, an image signal process unit 71 for generating image signals to be given to the three liquid crystal panels 41–43, based on the image signals sent from a signal generation device 81; a voice signal process unit 72 for generating voice signals to be given to a speaker 82, based on the voice signals sent from the signal generation device 81; a fan control unit 73 for generating control signals of the fans 611–613; a fluctuation signal generation unit 74 for generating signals to provide the numbers of revolutions of the fans 611–613 with fluctuations; a lighting circuit 75 for lighting up the lamp 21; and a lighting time recording unit 76 for recording the cumulative amount of lighting time.

As the signal generation device 81, any device such as a tuner, a computer, or a VTR can be used. The signal generation device 81 and the speaker 82 can be either united or not united with the projector 1.

The structure involving the control of the fans 611–613 can be constructed as a special electric circuit, or can be realized by making the CPU perform some of the calculation process in accordance with a program.

The image signal process unit 71 generates the R component, the G component, and the B component of image signals (hereinafter referred to as the R image signal, the G image signal, and the B image signal) sent from the signal generation device 81. These R, G, and B image signals are given to the R liquid crystal panel 42, the G liquid crystal panel 41, and the B liquid crystal panel 43, respectively.

The image signal process unit 71 comprises a level calculation unit 711 for finding the levels of the R, G, and B image signals (which correspond to the mean value of the intensities of all the color components of the entire image region, and which are hereinafter referred to as intensity levels), and the intensity levels of the R, G, and B are entered into the fan control unit 73.

In the same manner, the voice signal process unit 72 comprises a level calculation unit 721 for finding the levels of voice signals (hereinafter referred to as voice levels), and the voice levels found are entered into the fan control unit 73.

The fluctuation signal generation unit 74 generates fluctuation signals for providing the numbers of revolutions of the fans 611–613 with time fluctuation, and the fluctuation signals generated are entered to the fan control unit 73.

The lighting time recording unit 76 records the cumulative amount of lighting time of the lamp 21 to a nonvolatile memory 761 upon receipt of the signal from the lighting circuit 75. The contents recorded in the memory 761 are entered to the fan control unit 73. When the lamp 21 is replaced, the cumulative amount of lighting time stored in the memory 761 is reset.

The following is a description of how the fans 611–613 are controlled by the fan control unit 73 which receive signals from the level calculation unit 711, the level calculation unit 712, the fluctuation signal generation unit 74 and the lighting time recording unit 76.

In a projector which performs image projection by supplying the light from the light source with image data, or with non-uniform intensities corresponding to images by using a display device, when a white image is projected, most part of the light from the light source is guided to the projective region by the display device. On the other hand, when a black image is projected, most of the light from the light source is absorbed (or can be reflected or scattered) by the display device so as to be shielded. Consequently, when a black image is projected, the display device (in the vicinity of the display device in the case where light is reflected to be shield) gets hot.

In a projector using liquid crystal panels as a display device, the light from the light source is supplied with image data by the polarizers of the liquid crystal panels absorbing the light. As a result, when a dark image is projected, the liquid crystal panels (polarizers in particular) get hot. In the prior art projector using liquid crystal panels, when a black image is projected, the cooling fan is continuously revolved at a sufficiently high number of revolutions so as not to cause the liquid crystal panels to be damaged by heat. Consequently, high noises occur continuously. To avoid this problem, the projector 1 performs noise reduction control by reducing the numbers of revolutions of the fans 611–613 when the liquid crystal panels 41–43 absorb a little light.

In the three-panel type projector 1 which uses three liquid crystal panels 41–43 as component devices and which composes a display device from three liquid crystal panels 41–43, the R liquid crystal panel 42 has less heat when the image has a bright R component; the G liquid crystal panel 41 has less heat when the image has a bright G component; and the B liquid crystal panel 43 has less heat when the image has a bright B component. Therefore, the level calculation unit 711 of the image signal process unit 71 finds the intensity levels of the R, G, and B image signals or the illumination of the R, G, and B components of the image to be projected. Then, the intensity levels found are entered to the fan control unit 73 so as to control the numbers of revolutions of the fans 611–613.

The fan control unit 73 includes control circuits 731 which individually control the numbers of revolutions of the fans 611–613. The intensity levels of the R, G, and B image signals are entered to the control circuits 731 respectively connected to the fan 612 for R panel, the fan 611 for G panel, and the fan 613 for B panel. The numbers of revolutions of the fans 611–613 are individually controlled so that they can be decreased with increasing intensity levels of these color components.

Thus, the number of revolutions of the fan 612 for R panel reduces when the R liquid crystal panel 42 has a little heat, the number of revolutions of the fan 611 for G panel reduces when the G liquid crystal panel 41 has a little heat, and the number of revolutions of the fan 613 for B panel reduces when the B liquid crystal panel 43 has a little heat. Consequently, unnecessary noises which would be caused by the fans 611–613 are suppressed, while the liquid crystal panels 41–43 are sufficiently cooled.

On the other hand, whether the noises caused by the fans are untoward or not depends on the circumstance where images are viewed; when there is a larger noise in the circumstance, the noise caused by the fans is not important. Therefore, in the projector 1, the level calculation unit 721 of the voice signal process unit 72 finds the voice levels and enters them to the fan control unit 73, and increases the numbers of revolutions of the fans 611–613 with increasing voice level, so as to achieve sufficient cooling.

Each control circuit 731 performs reducing the number of revolutions with increasing intensity level and increasing the number of revolutions with increasing intensity level, which could be synthesized in various manners. For example, it is possible that while the control based on the intensity levels is being performed, the number of revolutions can be gradually increased in accordance with an increase in voice level. If the number of revolutions, which is as a rule controlled in accordance with the voice levels, goes below the number of revolutions found from the intensity levels, the number of revolutions can be controlled to be in accordance with the intensity levels.

The cumulative amount of lighting time entered from the lighting time recording unit 76 to the fan control unit 73 is used to control the change of the numbers of revolutions of the fans 611–613 found based on the intensity levels and the voice levels. Since the lamp 21 loses its intensity as its cumulative time of lighting becomes longer, the liquid crystal panels 41–43 have less heat as the cumulative time of lighting becomes longer. Therefore, it would unnecessarily increase noises if the fans 611–613 were operated at the numbers of revolutions determined in accordance with the performance of a brand-new lamp 21, when the lamp 21 has been used for a long time period.

The fan control unit 73 refers to the cumulative amount of lighting time stored in the memory 761 and decreases the numbers of revolutions of the fans 611–613 as the cumulative amount of lighting time becomes larger. As a result, the unnecessarily increase in noise is prevented.

In the projector 1, the fan control unit 73 further receives fluctuation signals from the fluctuation signal generation unit 74. The fluctuation signals give fluctuations to the numbers of revolutions of the fans 611–613 determined based on the voice levels and the cumulative amount of lighting time, or correspond to noise signals given to the signals which control the revolutions.

Fluctuations generally indicate nonperiodic changes; the fluctuations given to the numbers of revolutions by the fluctuation signal generation unit 74 can include semi-nonperiodic changes having a long cycle. By using, as fluctuations, so-called 1/f noises whose amplification (or the amount of change in the number of revolutions) is decreased with increasing frequencies, discomfort (a feeling of grating) caused by the fans 611–613 can be further reduced.

The fluctuation signals can be given to the fan 63 for a lamp. As a result, the grating noise caused by the fan 63 for a lamp can be reduced.

As described hereinbefore, the projector 1 finds the intensity levels of the R, G, and B components of images, and individually decreases the numbers of revolutions of the fans as each of the intensity levels gets higher. This makes it possible to keep tabs on the numbers of revolutions in accordance with the image signals, preventing the occurrence of unnecessarily high noises. When the voice levels are high, the numbers of revolutions of the fans 611–613 can be increased to increase the cooling effects.

Further, the occurrence of unnecessary noises can be reduced in accordance with the cumulative amount of lighting time of the lamp 21, and the provision of the fluctuations to the numbers of revolutions of the fans 611–613 can reduce the grating noises.

The reduction in the numbers of revolutions of the fans 611–613 realizes a reduction in power consumption.

<2. Second Preferred Embodiment>

Figure 3:
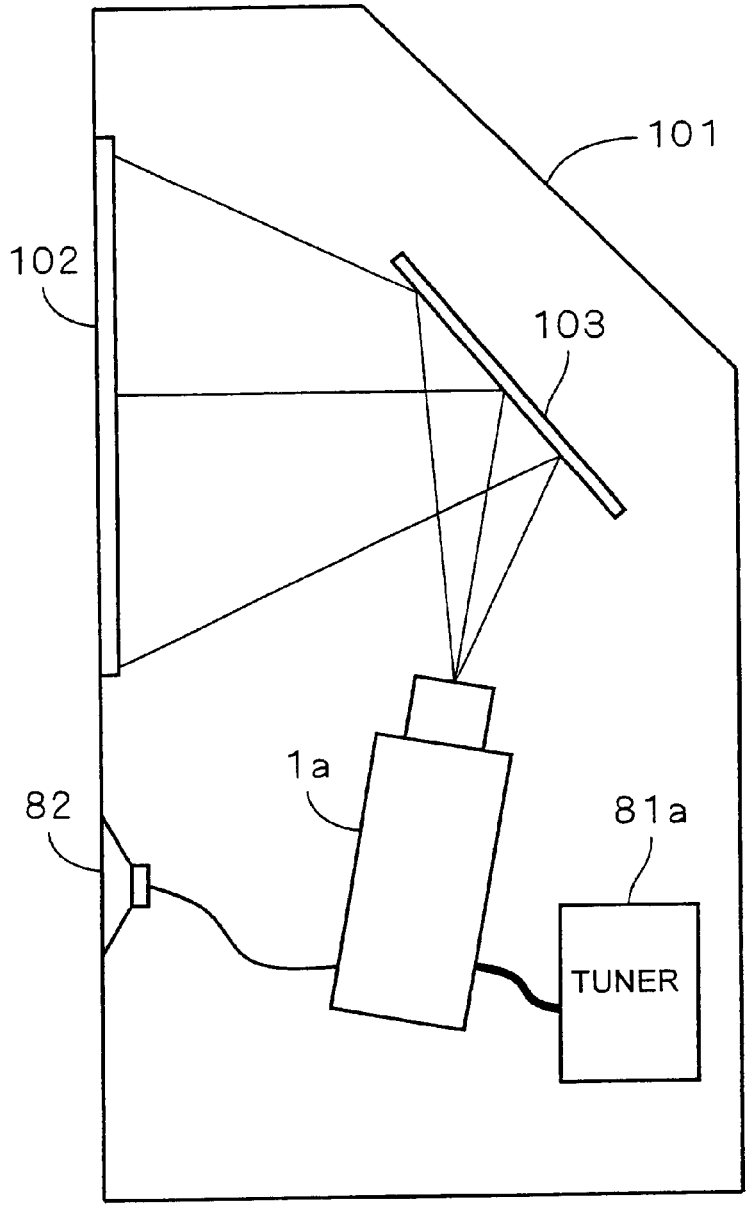
FIG. 3 shows the inner structure of the television system of a second preferred embodiment.

FIG. 3 shows the internal structure of the rear-projection type television system 100 of the second preferred embodiment of the present invention.

The television system 100 has a screen 102 which forms a projective region and on which images are projected from behind, at the front side of a casing 101 forming an outer main body. The casing 101 includes a projecting unit 1a and a mirror 103 for guiding the light from the projecting unit 1a to the screen 102. The casing 101 further includes a tuner 81a for transmitting image signals and voice signals to the projecting unit 1a and a speaker 82 for giving off voices, based on the voice signals from the projecting unit 1a.

Figure 4:
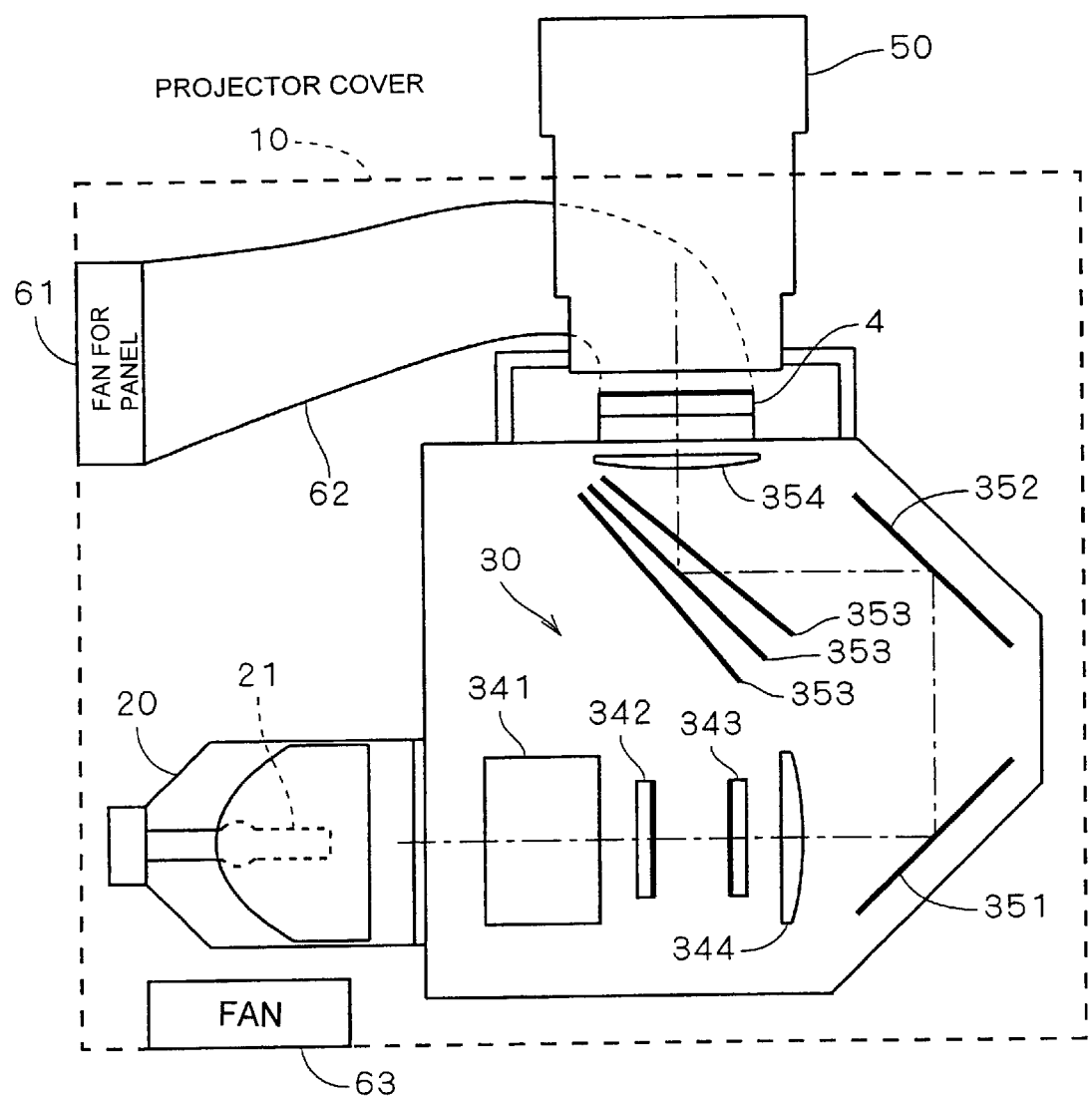
FIG. 4 shows the structure of the projector.

FIG. 4 shows the structure of the projecting unit 1a. FIG. 4 is illustrated in a simplified manner so that the internal structure can be understood better. The same components as those in the first preferred embodiment are referred to with the same symbols.

The projecting unit 1a is a so-called single-plate type projector comprising, inside the cover 10, a light source unit 20 for generating light for projection, a single liquid crystal panel 4, an optical system 30 for guiding the light from the light source unit 20 to the liquid crystal panel 4, and a lens unit 50 for emitting the light passed through the liquid crystal panel 4.

The cover 10 is provided with a fan 61 for cooling the liquid crystal panel 4, and the current of air from the fan 61 is guided to the liquid crystal panel 4 via a duct 62. In FIG. 4, the current of air from the fan 61 flows in the direction from the back side to the front side of the paper, or along the surface of the liquid crystal panel 4, and then is discharged.

Similar to the first preferred embodiment, the light source unit 20 has a discharge lamp 21 as a light source, and the cover 10 is further provided with a fan 63 for cooling the lamp inside the light source unit 20.

The light from the light source unit 20 is converted into polarized light having an approximately uniform intensity dispersion by a polarizing conversion element 341, lens arrays 342, 343, and a cemented lens 344.

The light passed through the cemented lens 344 is divided into color light of R, G, and B proceeding in slightly different directions by three dichroic mirrors 353 via mirrors 351 and 352, and goes into a field lens 354. As a result, the light having R, G, and B components is gathered and goes into pixels corresponding to the R, G, and B of the liquid crystal panel 4, and the light passing through the liquid crystal panel 4 is given color image data.

The light passed through the liquid crystal panel 4 is emitted from the lens unit 50, reflected by the mirror 103, and guided to the screen 102 so as to project color image onto the screen 102 as shown in FIG. 3.

Figure 5:
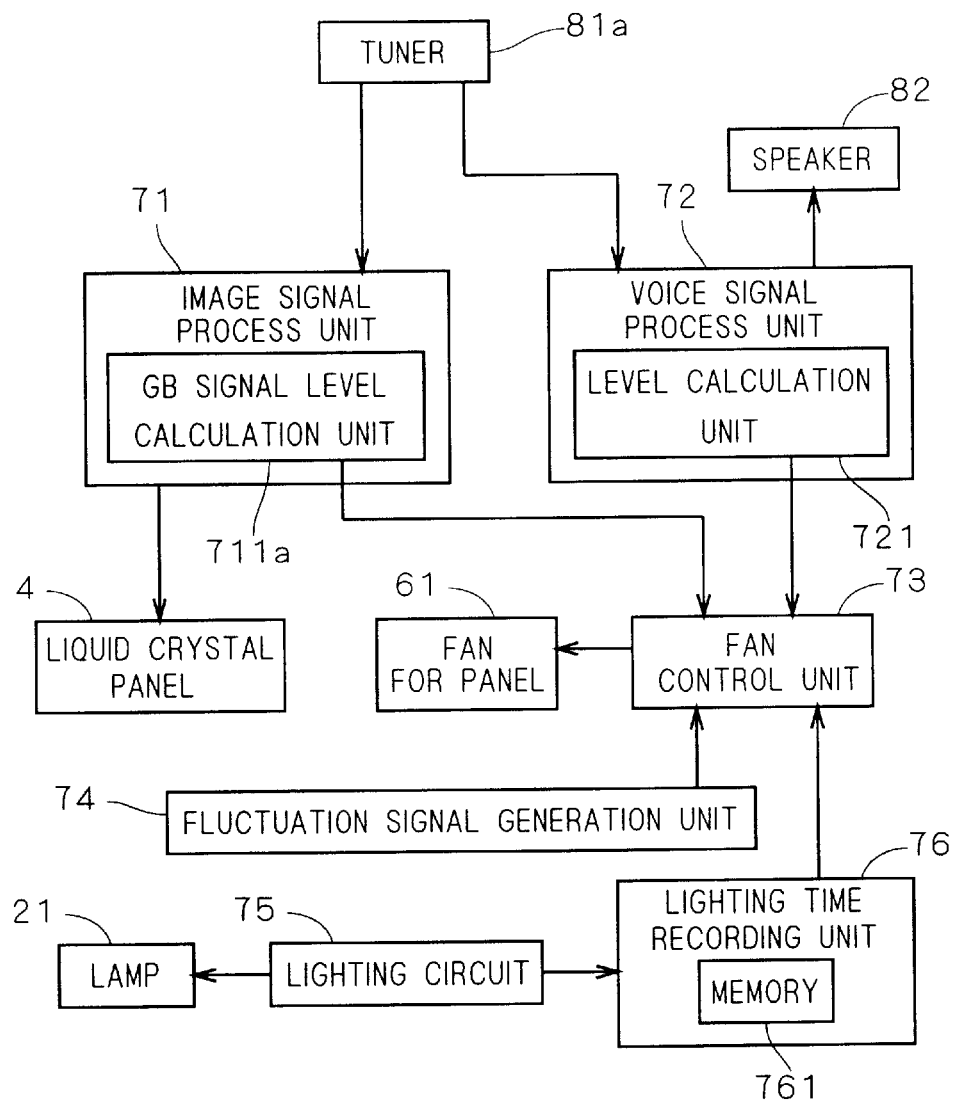
FIG. 5 shows the structure involving the control of the fan with other structures.

FIG. 5 is a block diagram showing the structure involving the control of the fan 61 for liquid crystal panel in the projecting unit 1a. Similar to the projector 1 of the first preferred embodiment, the projecting unit 1a comprises an image signal process unit 71, a voice signal process unit 72, a fan control unit 73, a fluctuation signal generation unit 74, a lighting circuit 75, and a lighting time recording unit 76.

These components have the same functions as those in the first preferred embodiment except that the image signal process unit 71 generates image signals given to the liquid crystal panel 4 based on the image signals sent from the tuner 81a, and the fan control unit 73 controls the fan 61 for liquid crystal panel.

The structure involving the control of the fan 61 can be constructed as a special electric circuit, or can be realized by making the CPU perform some of the calculation process in accordance with a program.

The GB signal level calculation unit 711a of the image signal process unit 71 finds the intensity levels of the G image signals and the B image signals combined (that is, the intensity levels of cyan). The intensity levels of G and B are entered to the fan control unit 73. When these intensity levels are high, the fan control unit 73 reduces the number of revolutions of the fan 61.

In the GB signal level calculation unit 711a, the intensity levels of the G and B image signals combined are found because the energy level of the light of the R component is small enough not to greatly affect an increase in temperature of the liquid crystal panel 4. On the other hand, the light of the G component and the light of the B component have approximately the same energy level. Therefore, proper cooling can be realized only by using the intensity levels of the G and B image signals combined. Using the G and B image signals can reduce the amount of calculation process to find the intensity levels, as compared with the case where all of the R, G, and B image signals are used, thereby simplifying the control.

Similar to the first preferred embodiment, in the projecting unit 1a, voice levels are found in the level calculation unit 721 of the voice signal process unit 72 and entered to the fan control unit 73. The number of revolutions of the fan 61 is increased as the voice levels get higher so as to perform sufficient cooling.

The cumulative amount of light time of the lamp 21 is recorded by the lighting time recording unit 76 connected to the lighting circuit 75 and then entered into the fan control unit 73. Thus, the number of revolutions of the fan 61 is reduced as the cumulative amount of lighting time of the lamp 21 becomes larger. The fan control unit 73 further receives signals from the fluctuation signal generation unit 74 so as to give fluctuations to the number or revolutions of the fan 61.

As described hereinbefore, the projecting unit 1a of the television system 100 finds the intensity levels of the G and B components of images combined, and decreases the number of revolutions of the fan 61 as the intensity levels get higher. This makes it possible to control the number of revolutions in accordance with the image signals, preventing the occurrence of unnecessarily high noises. When the voice levels are high, the number of revolutions of the fan 61 can be increased to increase the cooling effects.

Further, the occurrence of unnecessary noises can be reduced in accordance with the cumulative amount of lighting time of the lamp 21, and the provision of the fluctuations to the number of revolutions of the fan 61 can reduce the grating noises.

In particular, according to the television system 100, the projecting unit 1a is stored in the casing 101 and used in an ordinary household under severe noise control guidelines, so that the reduction in noise of the fan 61 or in discomfort caused by the noise becomes further effective.

<3. Modified Examples>

The preferred embodiments of the present invention have been described so far; the present invention is not restricted to them, and various modifications are possible.

In the above preferred embodiments, the transmission type liquid crystal panel is used as a device for display. Alternatively, as a display device for providing the projected light with image data, a reflective type liquid crystal panel or a DMD (digital micromirror device) can be used. In the case of the DMD which causes non-uniform intensities by reflecting light, the reflected light heats the vicinity of the DMD, so that the cooling by the wind is focused on the vicinity of the display device.

Thus, any device which can provide the light from the light source with image data can be used as the display device, and the cooling of the display device is not restricted to the display device itself, but can include heat-generating units caused by the display device.

The above description simply says that image are projected; images to be projected can be motion pictures or still pictures.

The level calculation unit 711 of the image signal process unit 71 in the first preferred embodiment can be provided as three special electric circuits for calculating the intensity levels corresponding to the color components.

In the projector 1 or the projecting unit 1a, voice signals are outputted to the speaker 82; however, instead, voice signals can be entered directly to the speaker 82 via the signal generation device 81 or the tuner 81a.

Although in the above preferred embodiments the revolutions of the fans are control by using the intensity levels or voice levels, the intensity levels of voice levels can be calculated as an average level in a predetermined short time, or can be found as a maximum value in a predetermined short time. Thus, it is not necessary to find the intensity levels or the voice levels strictly; any value can be used as long as it is an indicator of changes in time of the approximate illumination of the images or of the size of the voices.

In receiving a television broadcast, the number of revolutions of the fan for liquid crystal panel can be increased while commercials are being on the air, so as to increase the cooling efficiency temporarily.

The three-plate type projector 1 in the present preferred embodiment can be used as the rear-projection type television system of the second preferred embodiment, whereas the single-plate type projecting unit 1a in the second preferred embodiment can be used as the projector separate from a screen as in the first preferred embodiment.

In the second preferred embodiment, the GB signal level calculation unit 711a finds the intensity levels; however, when there is no need of reducing the calculation process, the intensity levels can be found from the R, G, and B image signals.

Furthermore, it is not necessary that the number of fans for liquid crystal panel and the number of the liquid crystal panels should be equal. For example, a plurality of fans can be provided for a single liquid crystal panel, while a plurality of liquid crystal panels can be cooled by a single fan.

While the invention has been shown and described in detail, the foregoing description is in all aspects illustrative and not restrictive. It is therefore understood that numerous other modifications and variations can be devised without departing from the scope of the invention.

What is claimed is:

1. A projector comprising:

a light source;

an optical system for guiding light from said light source to an projective region;

a display device for modulating the light from said light source, based on image signals, said display device being arranged in a light path of said optical system;

at least one fan for cooling said display device; and a fan controller for receiving signals based on said image signals and varying a number of revolutions of said at least one fan in accordance with changes in said image signals.

2. The projector according to claim 1, wherein said fan controller receives signals based on voice signals, and changes the number of revolutions of said at least one fan in accordance with changes in said voice signals.

3. The projector according to claim 1, wherein while changing the number of revolutions of said at least one fan, said fan controller provides fluctuations to the numbers of revolutions.

4. The projector according to claim 1 further comprising a memory for storing data concerning cumulative amount of lighting time of said light source, wherein said fan controller reduces the number of revolutions of said at least one fan, as said cumulative amount of lighting time becomes larger.

5. The projector according to claim 1, wherein said display device has a plurality of component devices corresponding to a plurality of colored lights;

said at least one fan includes a plurality of fans arranged separately in correspondence with said plurality of component devices so as to cool said plurality of component devices separately; and said fan controller controls the number of revolutions of said plurality of fans separately, based on said image signals corresponding to said plurality of colored lights.

6. The projector according to claim 1, wherein said display device is a single device for displaying images based on color image information;

said at least one fan is a single fan for cooling said single device; and said fan controller changes the number of revolutions of said single fan in accordance with changes of G and B color components contained in said image signals.

7. The projector according to claim 1, wherein said display device is a liquid crystal display device.

8. The projector according to claim 1, wherein said display device is a DMD.

9. A projector comprising:

a screen;

a main-body casing which forms the outside shape of said projector and in which said screen is installed;

a light source;

an optical system for guiding light from said light source to said screen;

a display device for modulating the light from said light source, based on image signals, said display device being arranged in a light path of said optical system;

at least one fan for cooling said display device; and a fan controller for receiving signals based on said image signals and varying a number of revolutions of said at least one fan in accordance with changes in said image signals.

10. The projector according to claim 9, wherein said screen is a rear-projection type screen.

11. The projector according to claim 9, wherein said fan controller receives signals based on voice signals, and changes the number of revolutions of said at least one fan in accordance with changes in said voice signals.

12. The projector according to claim 9, wherein while changing the number of revolutions of said at least one fan, said fan controller provides fluctuations to the numbers of revolutions.

13. The projector according to claim 9 further comprising a memory for storing data concerning cumulative amount of lighting time of said light source, wherein said fan controller reduces the number of revolutions of said at least one fan, as said cumulative amount of lighting time becomes larger.

14. The projector according to claim 9, wherein said display device has a plurality of component devices corresponding to a plurality of colored lights;

said at least one fan includes a plurality of fans arranged separately in correspondence with said plurality of component devices so as to cool said plurality of component devices separately; and said fan controller controls the number of revolutions of said plurality of fans separately, based on said image signals corresponding to said plurality of colored lights.

15. The projector according to claim 9, wherein said display device is a single device for displaying images based on color image information;

said at least one fan is a single fan for cooling said single device; and said fan controller changes the number of revolutions of said single fan in accordance with changes of G and B color components contained in said image signals.

16. The projector according to claim 9, wherein said display device is a liquid crystal display device.

17. The projector according to claim 9, wherein said display device is a DMD.

* * * * *